United States Patent [19]
Santilli

[11] Patent Number: 5,675,361
[45] Date of Patent: Oct. 7, 1997

[54] COMPUTER KEYBOARD POINTING DEVICE

[76] Inventor: Donald S. Santilli, 260 Piedmont Rd., Larkspur, Calif. 94939

[21] Appl. No.: 518,536

[22] Filed: Aug. 23, 1995

[51] Int. Cl.⁶ ........................................................ G09G 5/00
[52] U.S. Cl. .......................... 345/168; 345/156; 345/157; 345/158; 345/173
[58] Field of Search ............................. 345/156, 158, 345/160, 168, 173; 340/711; 341/22; 395/275

[56] References Cited

U.S. PATENT DOCUMENTS

| | | | |
|---|---|---|---|
| 5,189,403 | 2/1993 | Franz | 340/711 |
| 5,269,004 | 12/1993 | Comerford | 395/275 |
| 5,341,133 | 8/1994 | Savoy | 341/22 |
| 5,424,756 | 6/1995 | Ho | 345/158 |

OTHER PUBLICATIONS

A. Reinhardt "Touch & Feel Interfaces: Built–In Pointing Devices Replace Mice in Notebooks & Laptops," Feb. 1991 pp. 223–226 *BYTE*.

G. Smarte "Pointers in the Right Direction," Nov. 1994, pp. 252–253, *PC World*.

*Primary Examiner*—Richard Hjerpe
*Assistant Examiner*—David L. Lewis

[57] ABSTRACT

A device provides pointing device functions in a keyboard without requiring a keyboard operator to move his hands from their normal typing positions. Position sensitive elements at the top surfaces of a set of keys are used together to provide a large touch surface to allow accurate pointing. The position sensitive elements detect the position of a pointing object such as a finger on the top surfaces of these keys as an indication of information to be conveyed by the user.

11 Claims, 3 Drawing Sheets

COMPUTER KEYBOARD POINTING DEVICE

BACKGROUND—FIELD OF INVENTION

This invention relates to computer pointing devices, specifically to pointing devices which are located on the keyboard.

BACKGROUND—DESCRIPTION OF PRIOR ART

A computer user enters information using a keyboard and a pointing device. The user employs the keyboard by exerting pressure downward on the keys which sends corresponding signals to the computer. The user employs a pointing device such as a mouse, trackball, touchpad, or touchscreen to move a cursor on the screen to make selections. With a mouse or trackball, the device is moved with the hand or fingers to position the cursor. With a touchpad or touchscreen, the hands or fingers move on the device which is stationary to position the cursor. One of the most common pointing devices is the mouse which requires one to move the hand from the keyboard to use. This is a problem because it slows typing. Furthermore, the user's hand and even arm have to move during use which can be tiring compared to typing. Also, the mouse uses up considerable space which is a problem for laptop computers. Laptops have used an array of pointing devices incorporated on the keyboard to overcome this problem. These include trackballs, joysticks, isopoints, and touchpads. Touchpads offer the promise of having a pointing device which can be manipulated in a manner similar to typing and writing. The surface of the pad has a spatial correspondence to the surface of the computer screen, so as the finger moves around the pad, the cursor or pointer on the screen moves correspondingly to a new position. While the mouse locates the cursor on the screen by moving the cursor from the position where it was last touched in a direction corresponding to the movement of the mouse-incremental position movement, the touchpad usually locates the cursor to a position corresponding to a given location on the touchpad-absolute position movement.

Other devices are known in the art. Trackballs are spheres mounted in a base that allows the sphere to be freely rotated in all directions and speeds. The cursor on the display device is displaced in proportion to the speed and direction at which the sphere is rotated. Joysticks work by moving the cursor in the direction that the joystick is moved and the time of movement is governed by the duration for which the joystick is held in the non-neutral position. Isopoints use a cylindrical bar which slides along and revolves around its central axis to position the cursor. These devices, though compact, are more difficult to use for pointing than mice or touchpads. These pointing devices are described in the February 1991 issue of BYTE magazine in an article entitled "Touch-and-Feel Interfaces: Built-In Pointing Devices Replace Mice in Notebooks and Laptops," page 223 and in an article in the November 1994 issue of PC WORLD entitled "Pointers in the Right Direction," page 252.

A potential problem with the touchpad concerns accuracy in pointing. This can be overcome by using software which aids the arrow in going to a desired function. Also, using a pad of sufficient size aids pointing accuracy as does locating the cursor at the center of mass of the area activated by the finger. Using such a device to "loop" objects on the screen by drawing a closed loop with a finger is much easier than doing the same operation with a mouse, trackball, or joystick because the motion is like writing or drawing. Also, since one part of the touchpad surface always corresponds to one part of the viewscreen, it can be easier to quickly point to an object on the screen than when using other types of pointing devices.

Another problem with the pad is that it takes up space on a keyboard-for example, 6–20 square centimeters—which is especially a problem with laptops. Furthermore, the hand has to leave the keyboard to do the pointing operation which is inconvenient. The touch pad is usually located above or below the keyboard. Perhaps locating it between the left and right hand portions of a split keyboard would help, but awkward reaching would still be required and space is used.

Recently some inventions have appeared which allow the hand to remain on the keys when a pointing operation is required. Home Row, Inc has developed a keyboard with a key which can be used as a joystick. After pressing a combination of keys to switch from typing mode to pointing mode, some keys become "mouse clicker buttons" while one key becomes a joystick which senses the forces applied by a user's finger to position a cursor. More recently, Comerford and Laibinis in U.S. Pat. No. 5,269,004 (1993) describe using a key on the keyboard for joystick type operations. A trackpad cursor positioning device to simulate the movement of a trackball using optical sensing has been disclosed by Ho and Li in U.S. Pat. No. 5,424,756 (1995). These authors claim the incorporation of the device on the <SPACE> bar. However, as discussed above, using joysticks and trackballs is not as fast or accurate as using a mouse or touchpad for pointing operations. A touchpad on the top surface of a single key has been disclosed by Savoy in U.S. Pat. No. 5,341,133 (1994). The key contains electro-optical elements for detecting the position of a pointing object. However, the surface area of the top surface of a key is usually only about 1 to 2 square centimeters, so drawing and pointing accurately is difficult because small movements made by the pointing finger cause the cursor to move large distances. Typical separate touchpads are significantly larger than 1–2 square centimeters, and the touch surfaces can be from about 6 to 20 square centimeters to allow accurate pointing. Even though U.S. Pat. No. 5,341,133 teaches that the top surfaces of other keys may be used as touchpads, each key with a position detector can be used to point to the entire screen, so a small movement of the finger causes a large displacement of the cursor. As a result, in order to obtain more accurate pointing using the sensor scheme described in U.S. Pat. No. 5,341,133, the patent teaches that a large touchpad separate from the keys can be used. Finally, as with the Home Row device, the invention described in U.S. Pat. No. 5,341,133 requires the keyboard to have two modes of operation. A second key contains a sensor to provide signals used for switching the first key from its normal typing mode to a pointing mode.

OBJECTS AND ADVANTAGES

Accordingly, the objects and advantages of this invention are:

a) to provide an accurate pointing device which is located on the keyboard so that the user does not have to move the hands from the home typing position to do pointing operations;

b) to provide a pointing device which takes up no additional space on a keyboard;

c) to provide a pointing device which is ergonomically superior to mice, joysticks, and trackballs, and the user can use his fingers on a position sensitive surface to position the cursor; and

3 d) to provide a pointing device which can be used without having to switch the keyboard from typing to pointing mode.

The pointing device of this invention has the advantage in that not only can the computer keyboard user switch from typing to pointing operation without moving the hands or switching the keyboard mode, but also the position sensitive surface used for pointing can be almost as large as the surface area of the entire keyboard if desired. This is even larger than the surface area of typical separate touchpads and increases pointing accuracy. By being under the fingers when needed, the pointing device takes up no extra space. Further objects and advantages will become apparent from a consideration of the ensuing description.

Figure 1:
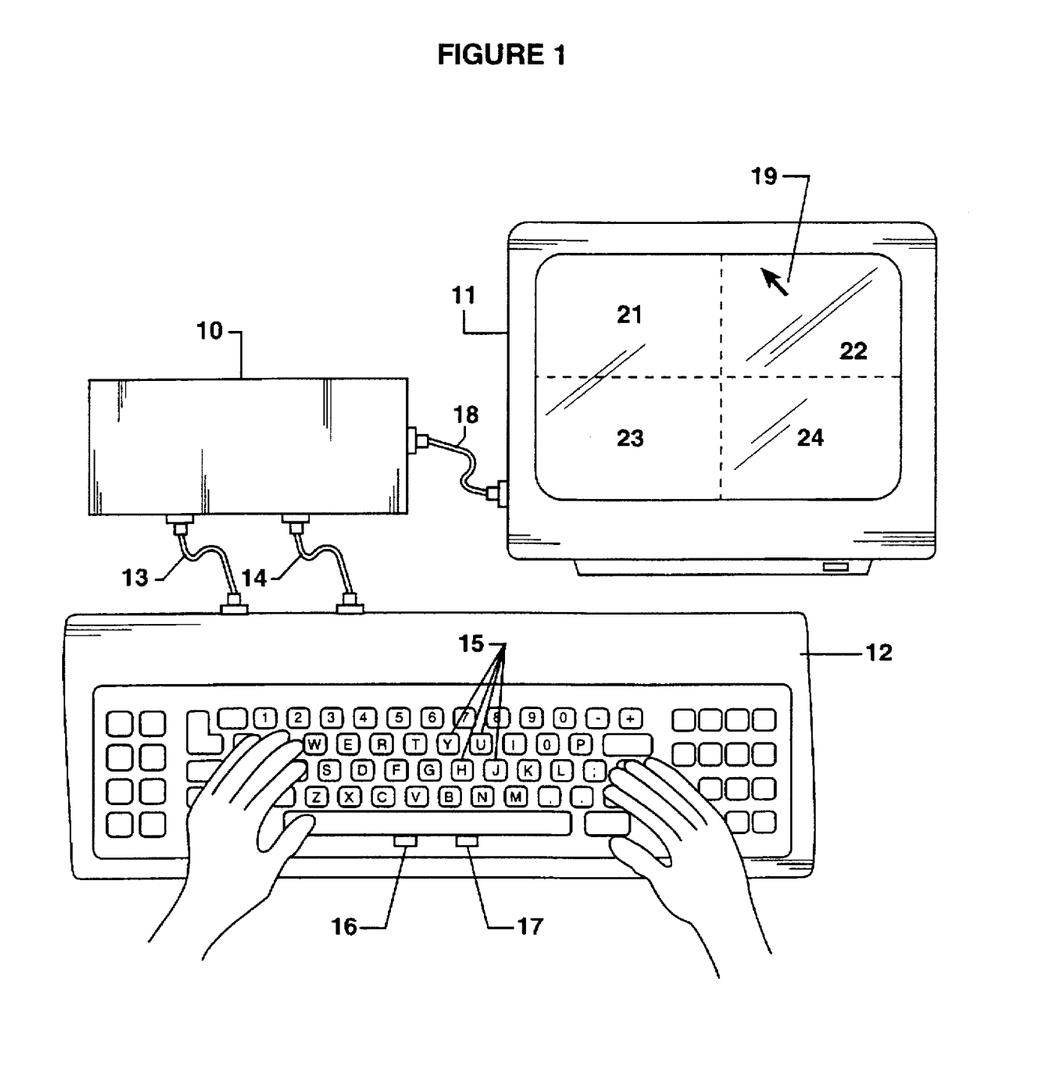
FIG. 1 illustrates a keyboard data entry system incorporating control function apparatus such as pointing apparatus in accordance with the present invention.
Figure 2:
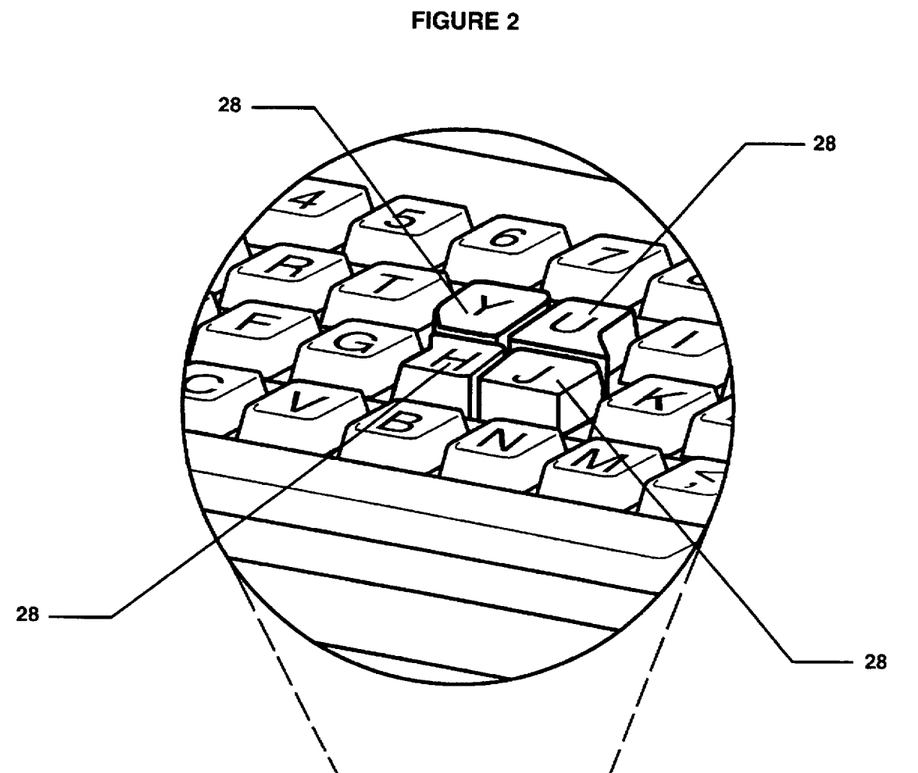
FIG. 2 is an enlarged view of part of the keyboard shown in FIG. 2A. It illustrates the more continuous key top touch surface made possible by extending the top surfaces of the adjacent keys 28 which have position sensitive surfaces so the key tops substantially fill the spaces between the top surfaces of these adjacent keys.
Figure 2A:
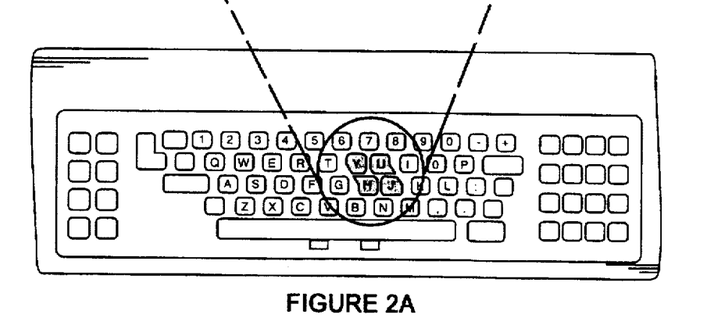
FIG. 2A is a top view of a keyboard and illustrates the more continuous key top touch surface made possible by extending the top surfaces of the shaded adjacent keys which have position sensitive surfaces so the key tops substantially fill the spaces between these adjacent keys.
Figure 3:
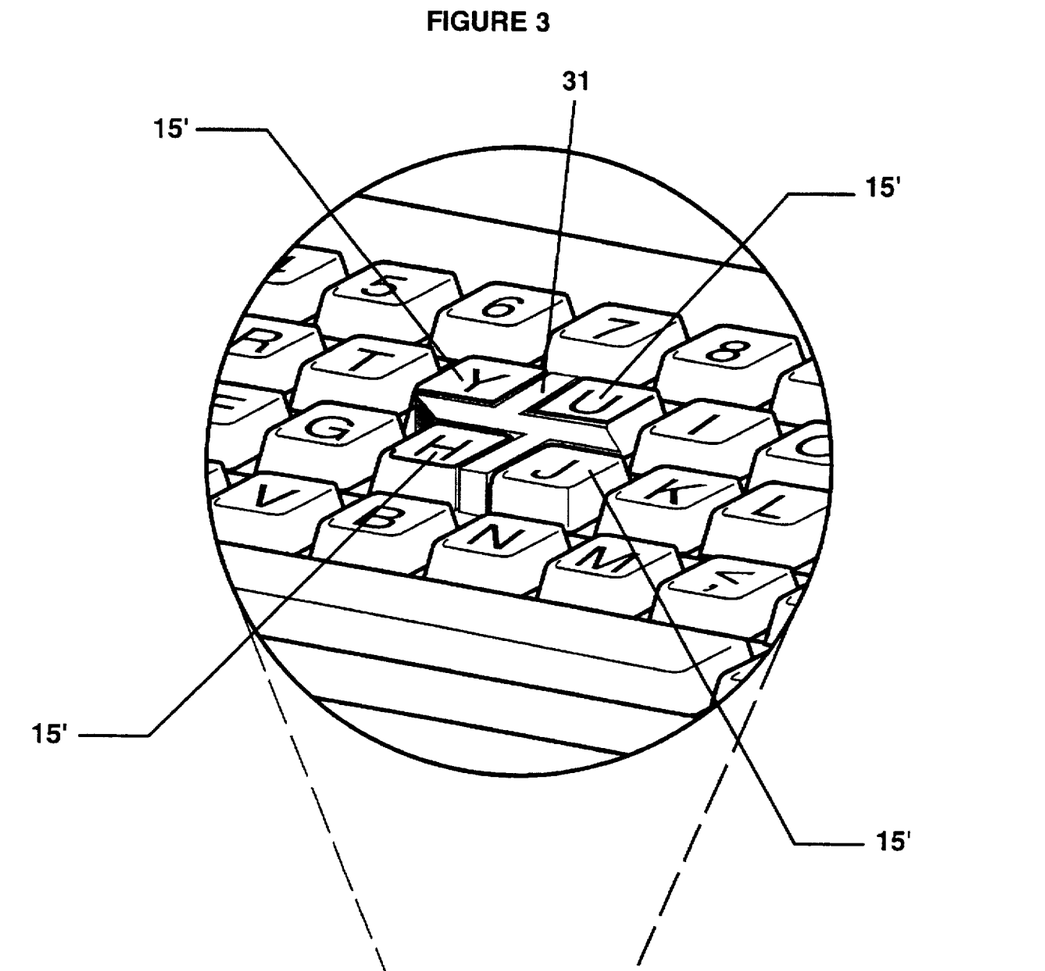
FIG. 3 is an enlarged view of pad of the keyboard shown in FIG. 3A. It illustrates how the addition of a filler section 31 with a position sensitive surface and located between adjacent keys 15' which have position sensitive surfaces forms a more continuous touch surface on the top of the adjacent keys and the filler section.
Figure 3A:
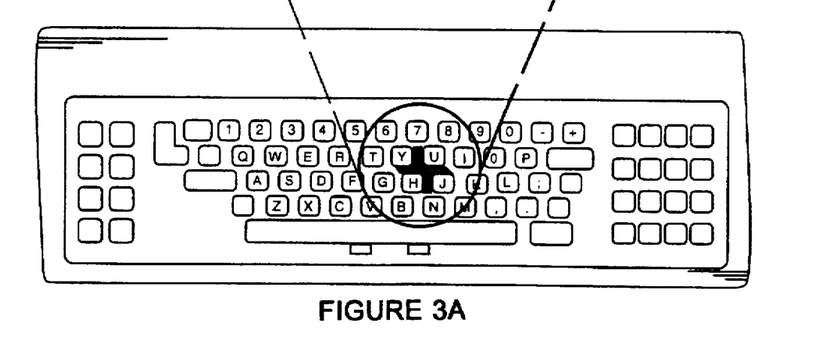
FIG. 3A is a top view of a keyboard and illustrates how the addition of a filler section (shaded) with a position sensitive surface and located between adjacent keys which have position sensitive surfaces forms a more continuous touch surface on the top of the adjacent keys and the filler section.

DESCRIPTION—FIGS. 1–3

FIG. 1 is a view of a keyboard operated computer system including a computer 10, a display device 11, and a keyboard 12 implemented in accordance with this invention. The keyboard has a layout of keys which is essentially an industry standard. Keyboard 12 is comprised of a primary group of keys which can be vertically displaced by a user. The primary group of keys is essentially all of the usual keys on the keyboard. A first sensor (not shown) is coupled to each of the keys to produce a coded keyboard signal indicative of a character or command when the key is pressed down. This signal is transmitted to the computer using a keyboard output cable 13. This is the usual function of a typical computer keyboard, and construction of such a device is well known in the art.

There exists at least one secondary group of keys, and the secondary group of keys is a subset of the primary group of keys and consists of two or more keys. It is preferred that any key between any two keys of the secondary group of keys also be a member of the secondary group of keys. This forms a block of keys to be used together. As an example, in FIG. 1 a block 15 including the keys J, U, Y, and H is shown.

4

The keys belonging to the secondary group of keys contain position detectors (not shown) which are coupled to a second sensor (not shown). The second sensor produces a control signal in response to the position of an object on the top surface of the keys belonging to the secondary group of keys. This is a control data signal. The control signals are transmitted to the computer using a control output cable 14.

In one embodiment of this invention, a clicker key or several clicker keys are located somewhere on the keyboard. In FIG. 1, clicker keys 16 and 17 are located on the side of the <SPACE> bar which faces the user and can be pressed in by the user's thumbs. Clicker keys 16 and 17 are coupled to the second sensor (not shown). The second sensor produces a control signal as a response to the application of force on clicker key 16 or 17. This is a control command signal. A clicker key is any key which is coupled only to the second sensor and can be used to generate a control command signal. The control command signal is transmitted to computer 10 using a control output cable 14. In another embodiment of this invention in which the keyboard can operate in two modes (as discussed later), in addition to being coupled to the position detectors, the second sensor is coupled to any number of keys of the primary group of keys which are also coupled to the first sensor. Control command signals are produced in response to vertical pressure on any of these keys. As an example, the F key can be coupled to the second sensor (not shown) in addition to the flint sensor.

The details of the design of a computer system in which these different control signals can be generated are well know in the art.

Computer 10 is coupled to the first and second sensors using cables 13 and 14 (FIG. 1). The computer is responsive to the keyboard signal from the first sensor for producing decoded keyboard signals for each of the different coded signals produced by each of the keys. The computer is also responsive to the control signal produced by the second sensor for executing a control function. This is essentially what is done with typical computers and computer keyboards containing pointing devices and is well known in the art.

Display device 11 is coupled to computer 10 with a cable 18 (FIG. 1), and the display device displays characters in response to the decoding of the keyboard signals by the computer. As shown in FIG. 1, display device 11 also displays a cursor 19 such as an arrow at a certain position on the display device in response to the execution of the control data signal by the computer. Execution of the control command signal by the computer results in the selection of the function to which the cursor is pointing. Methods to accomplish these functions are also well known in the art.

As previously stated, each of the keys belonging to the secondary group of keys has a top surface which is sensitive to the position of an object on the surface. This is accomplished by the use of a position detector. Position detectors are well-known in the art. Position detectors are described in U.S. Pat. No. 5,341,133, by Chan in U.S. Pat. No. 5,283,558 (1994), in U.S. Pat. No. 5,424,756, by Knowles et al. in U.S. Pat. No. 5,334,805 (1994), by Proctor et. al in U.S. Pat. No. 3,304,612 (1967), by Doughly in U.S. Pat. No. 4,471,177 (1984), and by Thomburg et al. in U.S. Pat. No. 4,570,149 (1986) for example. Touchpads using position detectors are now sold commercially. An example is the GlidePoint from Cirque Corporation as mentioned in the November 1994 issue of PC WORLD in an article on page 252.

These position detectors can be made using thin wire grids which sense the location of the object using resistance or electronic field measurements in response to pressure on the surface of the touch area. It is preferred that the pressure required to cause the position sensor to sense the pointing object is less than the pressure required to depress the key. Another way that the top surfaces of the keys can sense the position of an object is described in U.S. Pat. No. 5,424,756. Here, optical sensing is used to measure the velocity and direction of a pointer across a tracking area. U.S. Pat. No. 5,334,805 describes using acoustic waves to locate the position of the pointing object. U.S. Pat. No. 5,341,133 teaches how to incorporate a position detector in a single key, and electro-optical elements are used to sense the position of the pointing object (which is usually a finger) on the top surface of the key. None of these latter three methods requires the application of vertical pressure downward on the surface of the keys "nor does the position detector system have to be contained in the keys of the secondary group of keys". The details of how the position detector is constructed and coupled with the second sensor are well-known in the art. These details are described in previous inventions, some of which are cited above, and these are incorporated herein by reference.

In FIG. 1, the four keys in block 15 contain position detectors. This secondary group of keys includes the J, H, Y, and U keys in this example. All of the position detectors are coupled to the second sensor which produces a control data signal in response to the position of an object on the top surface of the keys containing the position detectors. In a touchpad (absolute position movement) mode, moving an object over the top surface of one of these keys moves the cursor over only part of the viewscreen on display device 11. In the touchpad mode, the top surfaces of more than one of the keys containing position detectors are required to position the cursor anywhere on the viewscreen. So, the top surface area of the J, U, H, and Y keys, block 15 in FIG. 1, is used to position cursor 19 on display device 11. When used as a touchpad (absolute position movement), the position sensor on the Y key controls the movement of the cursor in the upper left quadrant of the display device—area 21 in FIG. 1, the position sensor on the U key controls the movement of the cursor in the upper right quadrant of the display device—area 22 in FIG. 1, the position sensor on the H key controls the movement of the cursor in the lower left quadrant of the display device—area 23 in FIG. 1, and the position sensor on the J key controls the movement of the cursor in the lower right quadrant of the display device—area 24 in FIG. 1.

Additional embodiments of this invention are shown in FIGS. 2 and 3. In FIG. 2, the J, U, H, and Y keys contain position detectors (not shown) as described for FIG. 1. However, the space between the top surfaces of these four adjacent keys is minimized by extending the top surface of each key so that the edges almost touch. This is shown as the block of keys 28 in FIG. 2, looking down on the keyboard. Typically, the distance between the edges of two key surfaces is about 6 mm. In this embodiment, the edges of the top surfaces of the four adjacent keys are about 3 mm apart or less. The top surface of block 28 is substantially planar except for the smooth contours from the usual "dishing" on the key surfaces (not shown) and the less than about 3 mm space between the keys. The sides of the keys which make up the primary group of keys and which are not a part of the secondary group of keys can flare out as is usual in keyboards. But in this embodiment, the sides of the four keys of the secondary group of keys that face the sides of the other keys of the secondary group of keys must go down 90 degrees from the top surface or angle inward. In this way, the individual keys are capable of vertical displacement despite the proximity of the top surfaces.

In the embodiment shown in FIG. 3, the top surfaces of the four keys of block 15' are shaped in the same way as all of the other keys on the keyboard. These four keys belonging to the secondary group of keys contain position detectors (not shown) as described above for FIG. 1. A filler section 31 is used to substantially fill the space between the top surfaces of these four keys. Filler section 31 also contains a position detector (not shown), and it is used in conjunction with the position detectors of the surrounding keys in block 15'. These position detectors sense the location of an object on the top surface of the secondary group of keys which includes the four keys of block 15' and filler section 31 and are coupled to the second sensor (not shown). The second sensor produces a control data signal in response to the position of an object on the top surfaces of the keys of block 15' and the filler section 31. In one embodiment of this invention, filler section 31 can be fixed so that its top surface is at substantially the same level as the top surfaces of the four adjacent keys of block 15'. In another embodiment (not shown), the filler section can be mounted in a manner which allows it to occupy two positions: either with the top surface substantially level with the top surfaces of the keys of block 15', that is, J, U, Y, and H in FIG. 3, or with the top surface set at a slightly lower position. This can accomplished in ways well known in the art such as using a mechanism that is used in some "Caps Lock" keys or even used with ballpoint ink pens with retractable points. The sides of the keys of block 15' which are adjacent to filler section 31 make an about 90 degree angle with the top surface or angle inward instead of flaring out. This allows filler section 31 to be lowered without contacting the sides of the surrounding keys.

The ability of the keyboard to operate in two modes is necessary in embodiments of this invention lacking a clicker key and optional in embodiments in which a clicker key is present. When no clicker key is present, the keyboard also contains devices (not shown) for determining whether the computer is responsive to the keyboard signal from the first sensor (a keyboard mode of operation) or the control signal produced by the second sensor (a control mode of operation). The keyboard signal is for entering text and commands as is usually done. The control signal can be the control data signal to position the cursor in response to the position of a pointing object on the top surface of the secondary group of keys, or the control command signal in response to the application of force on keys of the primary group of keys which are coupled to the second sensor. The control command signal instructs the computer to execute the selection of the function to which the cursor is pointing.

The mode switching can be done in many ways. For example, the simultaneous depression of two predefined keys can send signals which cause computer 10 to respond to the control signals from cable 14 instead of the keyboard signals from cable 13. So, for example, the F key can be connected to both sensors. When the F key is depressed, both keyboard and control signals are generated. In the keyboard mode of operation, the computer is responsive to the keyboard signal and in the control mode of operation, the computer is responsive to the control command signal. Different keys can be used to generate different control command signals. Other ways for changing from the keyboard mode of operation to the control mode of operation are possible such as using a sensor on the <SPACE> bar as described in U.S. Pat. No. 5,341,133. In this embodiment, the touch surface of a key such as the top surface of the <SPACE> bar is sensitive to a sliding motion, and such a motion provides signals for switching modes. If the embodiment of the invention shown in FIG. 3 is being used, clicking filler section 31 up to the position in which its top surface is substantially even with the top surfaces of the keys of block 15' can switch operation modes. When filler section 31 is moved to the "up" position, the keyboard switches to the control mode of operation. When the filler section is moved to the "down" position, the keyboard switches to the keyboard mode of operation. Even the movement of an object across the top of some of the keys of the secondary group of keys to create a signal as described in U.S. Pat. No. 5,341,133 can be used to switch operation modes. Also, a separate key on the keyboard can be used to generate signals for switching modes of operation. Such switching devices are well known in the art, and some are described in previous patents as mentioned above. These are incorporated herein by reference. The examples are for illustrative purposes only and should not be considered as limiting.

OPERATION—FIGS. 1-3

Two Mode Operation.

If control command signals are generated by depressing keys which can also generate keyboard signals, two mode operation is required. In this way, the computer responds to one or the other type of signal when such a key is depressed. At the beginning of operation, the keyboard may be in a keyboard mode of operation. In this mode, the user types by depressing the keys which encode text and commands, for example, and which are displayed and executed in the usual manner. In this mode, the computer is responsive to the keyboard signal from the first sensor. In order to do pointing operations, the user then switches from the keyboard mode of operation to the control mode of operation using one of the methods described earlier such as depressing two predefined keys simultaneously.

In the control mode, the computer is responsive to the control signal produced by the second sensor. The control signal can be the control data signal which the computer executes to position the cursor on the display device in response to the position of a pointing object on the top surface of the secondary group of keys. For example in FIG. 1, if the position detector is being used as a touch pad, to move cursor 19 from the lower left corner of the viewscreen of display device 11 to the upper right corner, the user moves her finger from the lower left corner of the top surface of the H key to the upper right corner of the top surface of the U key. After the cursor has been moved to the desired location (as a response to data from the position detectors in response to the location of the pointing object), the user can select the function displayed at that location by generating the control command signal. This signal instructs the computer to execute the selection of the function to which the cursor is pointing. (This operation is well-known in the art and is accomplished by clicking the mouse when mice are used for pointing, for example.) While in the control mode of operation, the keys of the primary group of keys which are coupled to the second sensor can be used to generate the control command signal. So, for example, in FIG. 1, with the keyboard in the control mode of operation, the user moves a finger across the top surfaces of the J, U, H, and Y keys (block 15) to position cursor 19 to point at a desired function on display device 11. The user then selects that function by depressing a key coupled to the second sensor such as the F key. This activates the control command signal to select the function. One could use the keys of the secondary group of keys for selecting a function by depressing the key that the pointing finger is on, but this could prove unwieldy for "point-and-drag" operations in which the cursor is moved while the selection key is held down. There are many other ways in which this control command signal can be activated. These examples are to illustrate the concept and should not be construed as limiting.

Also, mice can have several clicking buttons so that different pointing command signals can be chosen. This can be done using the pointing device of the present invention by using a first predetermined group of keys to execute a first pointing command signal, and a second predetermined group of keys to execute a second pointing command signal. So, when in the control mode of operation, applying pressure on one key from the first predetermined group of keys will generate a first pointing command signal and applying pressure on one key from the second predetermined group of keys will generate a second pointing command signal. Obviously, more clicking functions could be set up.

To return to the keyboard mode of operation in this example, the user presses the two predefined keys simultaneously. Switching back to the keyboard mode of operation could even be done by pressing a predefined key such as the <SPACE> bar.

One Mode Operation.

It is possible to have the computer respond to either the keyboard signals or the control signals without switching the mode of operation. This can be done by using clicker keys such as 16 and 17 shown in FIG. 1. Computer 10 receives both keyboard and control signals through cables 13 and 14 simultaneously. Keyboard signals operate just as described above for the keyboard mode of operation. However, the computer also continuously monitors the position of a finger on the top surface of the secondary group of keys (block 15 in FIG. 1, block 28 in FIG. 2, and block 15' and filler section 31 in FIG. 3) as a response to the control data signals generated by the second sensor which is coupled to the position detectors. The control command signal is generated when the user exerts force on clicker key 16 or 17. The computer executes the selection of the function to which the cursor is pointing as a response to the control command signal. Different clicker keys on the keyboard can generate different control command signals. In one mode operation, no key may generate both keyboard and control command signals when depressed.

So, using keyboard 12 (FIG. 1), the user types in text and commands in the usual way. For pointing operations, the user positions cursor 19 at a desired location on display device 11 (FIG. 1) by moving a finger to the corresponding location on the top surface of block 15. To select the function to which the cursor points, the user presses clicker key 16 or 17. The user can either select more functions by pointing and pressing the clicker keys or continue typing.

Accuracy in Pointing.

The more keys used in the secondary group of keys, the less distance the cursor on the display device moves for a given corresponding movement of the pointing object. In this way, greater accuracy in pointing can be obtained than, for example, if the position sensitive surface were all on the top surface of one key. When the top surface of only one key is used, a very small displacement of the pointing object, usually a finger, will cause the cursor to move a great distance. For a typical display device with a view screen with a diagonal length of about 40 cm, the ratio of the distance the cursor moves to the distance the pointing finger moves is about 20:1 when the surface of only one key is used as a touchpad. Using the pointing device in FIG. 2 in which the top surfaces of the four keys in block 28 are used as the position sensitive surface, the ratio of the distance the cursor moves to the distance the finger moves is about 8:1.

Accurate pointing is also enhanced if two other conditions are met. First, the contours of the top surface of the secondary group of keys should be fairly smooth. Contours would include the usual dishing of the keys and any sloping up in going from the second row of keys up to the third row. Second, the spaces between the keys of the secondary group of keys or between the keys and the filler section should be small relative to the size of the tip of the pointing object which can be a finger. The reason for the embodiments shown in FIGS. 2 and 3 are to create a touch surface that is fairly smooth and continuous. The reason that one might want filler section 31 to drop below the level of the top surface of the keys of block 15' is that when the top surface of the filler section is at about the same level as the top surfaces of the keys around it, typing could be impeded even more than when using the enlarged keys of block 28 shown in FIG. 2.

SUMMARY, RAMIFICATIONS, AND SCOPE

Thus the reader will see that the pointing device of this invention provides a user with the ability to accurately and easily carry out pointing operations without having to remove his hands from the keyboard. The pointing device is large enough that accurate pointing is possible, and yet it takes up no additional space on the keyboard. An essentially complete melding of typing and pointing operations is possible.

While the above description contains many specificities, these should not be construed as limitations on the scope of the invention but rather as exemplifications of preferred embodiments thereof. Many other variations are possible.
Multiple Touch Surfaces on a Keyboard.

It is possible to have several secondary groups of keys for pointing operations. These secondary groups of keys can be activated independently so that, for example, the keys J, U, H, and Y might be selected as the touch area by a right handed person, but the keys F, G, R, and T might be chosen by a left handed person. Or both areas could work simultaneously so that both hands could be used or two people could perform pointing operations if a game were being played. To select the function being pointed to, that is, the equivalent of the clicking operation of the mouse, separate keys or clicker keys could be predetermined to perform the selection. A given key may be specific for selecting the function that a specific secondary group of keys is being used to point to, or the key could select any function or functions being pointed to, regardless of which secondary group of keys is being used. Also, secondary groups of keys of different sizes could be available for the user to select. One pointing area could be the top surfaces of the H and J keys, and another choice might be the Y, U, I, H, J, K, B, N, and M keys for more accurate pointing because of the larger surface area of the touch sensitive region. Several cursors could appear on the screen simultaneously if more than one spot on a touch surface is being touched. All of the functions being pointed to could be selected simultaneously.

Even though a preferred embodiment is for the keys belonging to the secondary group of keys to be grouped together, one may choose to use separated keys. For example, the F key could be used to point at the left side of the viewscreen and the J key could be used to point at the right side.
More Accurate Pointing.

Although the top surfaces of the keys belonging to the secondary group of keys possess smooth contours to allow the facile execution of pointing and typing operations, some users may prefer a flatter surface for pointing operations. A straightforward way of doing this would be to use the embodiment of FIG. 2, but instead of having the keys of the secondary group of keys dished out in the usual way, the top surfaces of the keys of block 28 are flat and tilted slightly. By flattening and tilting these keys, the top surface of block 28 becomes a continuous plane except for the less than about 3 mm spaces between these keys. The planar surface slants upward away from the user. Flattening the key surfaces may impede typing, however, since the dishing helps guide the fingers into the proper position on the keys during typing. By using a piston like device beneath the top surface and inside of the key, and by having the top surface of the key be slightly elastic, the key surfaces could be flattened and tilted when the keyboard is switched to the control mode of operation. Then the usual dished shape and angle of the top surface could be restored during the keyboard mode for typing operation. Alternatively, when in the control mode of operation, the keys on the third row such as the Y and the U keys could be lowered so that the top surfaces are at substantially the same level as the H and the J keys when these four keys make up the secondary group of keys. So, by combining the lowering operation with the flattening operation, a substantially planar, non-tilted surface will be formed under the fingers.

The space between the keys belonging to the secondary group of keys can be largely filled by extending the top surfaces of the keys of block 28 as shown in FIG. 2 or by the use of filler section 31 as shown in FIG. 3. Using a combination of lowering or tilting certain keys, flattening the top surfaces of keys, and employing an adjustable filler section, the keyboard would be unchanged from the typical structure for typing operations, and then a substantially flat and continuous large touch surface would form under the fingers for pointing operations. Even the touch surface shown in FIG. 2 with the larger keys of block 28 could be modified by having the extended sides of the keys fold out of the way when in a keyboard mode of operation. Also, when the control mode of operation is chosen, the keys belonging to the secondary group of keys could be locked into position so that the user could press firmly and not depress the key. If clicking the filler section up and down is used to switch modes and the switching is not accomplished by using some other key or combination of keys, a knob at one end of the filler section could be used to facilitate pressing the section directly. In order to accomplish all of these manipulations, two mode operation would be needed.

In addition to using software and electronics to position the cursor at the center of mass of the pointing object for accurate pointing as discussed in the Background section, any type of software to aid pointing as is typically used with mice and other pointing devices can be used in conjunction with this invention. For example, some software lets the cursor "jump" to a function when the cursor is positioned sufficiently close to it. Also, the information obtained from a position detector can allow this pointing device to be used not only as a touchpad-like pointing device, but also as a mouse-, joystick-, trackball-, or track pad-like device as described in previous inventions such as U.S. Pat. No. 5,424,756 and U.S. Pat. No. 5,341,133. So, another way to improve pointing accuracy, especially when using the touch surface in a mouse mode (relative position movement), is to use software which causes the cursor to move only part way across the viewscreen when a pointer is moved across the entire top surface of a secondary group of keys. In this way, a larger movement of the finger used for pointing causes a smaller displacement of the cursor.

It may also be useful to have a device that can be worn on the end of the user's pointing finger. The device has a small tip like the end of a pencil which is used to contact the position sensitive surface. This would increase pointing accuracy. The tip could also provide a signal to which the position detectors are sensitive.

Other Considerations.

It may be useful to have the secondary group of keys and any associated filler sections in modular form so, if they are subject to more wear than the rest of the keyboard, they can be easily replaced.

For the pointing device of this invention, I described using keys to generate the control command signal to select a function which is being pointed to. These include clicker keys 16 and 17 in FIG. 1 for one mode operation and any key coupled to the second sensor for two mode operation. Other locations are possible for these keys. For example, clicker keys can be located between two rows of the keys comprising the primary group of keys. For example, one clicker key can be located between the G and T keys, and another clicker key can be located between the D and the R keys. The clicker key can also be a predesignated conventional key on the keyboard. However, because it is possible to have a touchpad-like device which can sense different levels of pressure, other options are available. For example, a light touch causes a cursor to appear and move around the screen as the pointing object is moved, and increased downward pressure can generate the control command signal. This could also be accomplished using two different types of sensors. For example, electro-optical elements can be used to sense the position of a pointing object on the touch surface, and essentially no pressure is required. This would generate the control data signal. Pressure sensitive elements can be embedded in the top surface of the keys belonging to the secondary group of keys, so after the cursor is positioned using signals from the electro-optical elements, the function to which the cursor points can be selected by exerting some downward pressure with the pointing finger. This pressure is sensed by the pressure sensitive elements and generates the control command signal.

When in one mode operation, the user may find it distracting to have the cursor moving around the viewscreen of the display device while typing. For example, in the embodiment of this invention shown in FIG. 1, when the user types a J and then a U, cursor 19 will move from somewhere in lower right quadrant 24 of the viewscreen to upper right quadrant 22. Although no function being pointed to will be selected until a clicker key is pressed, the user might prefer not to see a cursor during normal typing operations. Software can be employed to hide the cursor until a pointing motion is sensed such as the sliding of the finger along the top surface of the keys comprising the secondary group of keys. This motion would be different than the vertical depression motion used for typing.

A keyboard can be set up to be able to work in both one mode operation using clicker keys and in two mode operation by having a switching device to change operation modes. This would be useful if a user preferred a very flat touch area during operations such as drawing in which accurate pointing is critical. As described earlier, this can be done in a straightforward way using two mode operation. Alternatively, the user could choose the convenience of one mode operation during other operations such as word processing when extremely accurate pointing is not necessary but typing and pointing activities are alternated often.

Accordingly, the scope of the invention should be determined not by the embodiments illustrated, but by the appended claims and their legal equivalents.

I claim:

1. A keyboard and computer system for user entry of text and control functions comprising:
   (a) a primary plurality of keys, each of which is vertically displaceable in response to the application of a vertical force by a user;
   (b) at least one set of a plurality of secondary keys, each set of a plurality of secondary keys being a subset of said primary plurality of keys, each set of a plurality of secondary keys defining a touch sensitive pointing region comprising all of the top surfaces of that set of secondary keys;
   (c) at least one position detector system responsive to the position of an object relative to a corresponding touch sensitive pointing region defined by the top surfaces of a corresponding set of a plurality of secondary keys, said position detector system providing enhanced cursor accuracy due to the larger size of the touch sensitive pointing region as compared to the top surface of an individual key;
   (d) at least one clicker key located on the keyboard, and each of the clicker keys is responsive to the application of pressure by the user;
   (e) a first sensor coupled to said primary plurality of keys for producing a different coded keyboard signal indicative of a character or command in response to the vertical depression of each different one of said primary plurality of keys;
   (f) a second sensor coupled to said position detector system for producing a control data signal in response to the detected position of an object on the top surface of said set of a plurality of secondary keys wherein the movement of an object over the top surface of all of the keys belonging to said set of a plurality of secondary keys generates every control data signal, and said second sensor also coupled to said clicker keys for producing a control command signal in response to the application of pressure on said clicker keys by the user;
   (g) a computer coupled to said first and second sensors which is responsive to each of the different coded keyboard signals for producing decoded keyboard signals, and which is responsive to every said control data signal and said control command signal for executing a predetermined control function;
   (h) a display device coupled to said computer, on which characters are displayed in response to the decoding of keyboard signals by said computer, and on which other indicia is manifested in response to the execution of said predetermined control function by said computer.

2. The combination claimed in claim 1 wherein the top surfaces of adjacent keys belonging to said set of a plurality of secondary keys substantially fill the spaces between the adjacent keys belonging to said set of a plurality of secondary keys.

3. The combination claimed in claim 1 further including as part of said set of a plurality of secondary keys at least one filler section having a top surface which substantially fills the space between the top surfaces of adjacent keys belonging to said set of a plurality of secondary keys, the top surface of said filler section being at about the same level as the top surface of the adjacent keys belonging to said set of a plurality of secondary keys.

4. The combination of claim 3 further including positioning means for lowering said filler section so that the top surface of said filler section is lower than the top surface of the keys belonging to said set of a plurality of secondary, keys and positioning means for raising said filler section back to a position in which the top surface is at approximately the same level as the top surfaces of the keys belonging to said set of a plurality of secondary keys.

5. The combination claimed in claim 1 which includes:
means responsive to the application of pressure on one of said clicker keys as a first control command signal and the application of pressure on another of said clicker keys as different control command signal.

6. A keyboard and computer system for user entry of text and control functions comprising:
   (a) a primary plurality of keys, each of which is vertically displaceable in response to the application of a vertical force by a user;
   (b) at least one set of a plurality of secondary keys, each set of a plurality of secondary keys being a subset of said primary plurality of keys, each set of a plurality of secondary keys defining a touch sensitive pointing region comprising all of the top surfaces of that set of secondary keys;
   (c) at least one position detector system responsive to the position of an object relative to a corresponding touch sensitive pointing region defined by the top surfaces of a corresponding set of a plurality of secondary keys, said position detector system providing enhanced cursor accuracy due to the larger size of the touch sensitive pointing region as compared to the top surface of an individual key;
   (d) a first sensor coupled to said primary plurality of keys for producing in a keyboard mode of operation a different coded keyboard signal indicative of a character or command in response to the vertical depression of each different one of said primary plurality of keys;
   (e) a second sensor coupled to said position detector system for producing in a control mode of operation a control data signal in response to the detected position of an object on the top surface of said set of a plurality of secondary keys wherein the movement of an object over the top surface of all of the keys belonging to said set of a plurality of secondary keys generates every control data signal, and said second sensor also coupled to a predefined group of keys belonging to said primary plurality of keys for producing in said control mode of operation a control command signal in response to the vertical depression of each different key belonging to said predefined group of keys by the user;
   (f) switching means for providing signals to change from said keyboard mode of operation to said control mode of operation and from said control mode of operation to said keyboard mode of operation;
   (g) a computer coupled to said first and second sensors which is responsive to each of the different coded keyboard signals for producing decoded keyboard signals, and which is responsive to every said control data signal and said control command signal for executing a predetermined control function;
   (h) a display device coupled to said computer, on which characters are displayed in response to the decoding of keyboard signals by said computer, and on which other indicia is manifested in response to the execution of said predetermined control function by said computer.

7. The combination claimed in claim 6 wherein the top surfaces of adjacent keys belonging to said set of a plurality of secondary keys substantially fill the spaces between the adjacent keys belonging to said set of a plurality of secondary keys.

8. The combination claimed in claim 6 further including as part of said set of a plurality of secondary keys at least one filler section having a top surface which substantially fills the space between the top surfaces of adjacent keys belonging to said set of a plurality of secondary keys, the top surface of said filler section being at about the same level as the top surface of the adjacent keys belonging to said set of a plurality of secondary keys.

9. The combination of claim 8 further including positioning means for lowering said filler section so that the top surface of said filler section is lower than the top surface of the keys belonging to said set of a plurality of secondary keys in said keyboard mode of operation, and positioning means for raising said filler section back to a position in which the top surface is at approximately the same level as the top surfaces of the keys belonging to said set of a plurality of secondary keys in said control mode of operation.

10. The combination claimed in claim 6 which includes:
means responsive to the application of a downward force on any one of said predefined group of keys belonging to a primary predefined group of keys as a first control command signal and the application of a downward force on any one of said predefined group of keys belonging to a secondary predefined group of keys as a second control command signal when in said control mode of operation.

11. A method of operating a keyboard and computing system with the keyboard including
   (a) a primary plurality of keys, each of which is vertically displaceable in response to the application of a vertical force by a user to produce a keyboard signal when in a keyboard mode of operation, and a control command signal when in a control mode of operation,
   (b) at least one set of a plurality of secondary keys, each set being a subset of said primary plurality of keys, each set of a plurality of secondary keys defining a touch sensitive pointing region comprising all of the top surfaces of that set of secondary keys, and a position detector system responsive to the position of an object relative to a corresponding touch sensitive pointing region defined by the top surfaces of a corresponding set of a plurality of secondary keys to produce a control data signal when in said control mode of operation wherein the movement of an object over the top surface of all the keys belonging to said set of a plurality of secondary, keys generates every control data signal, said detector system providing enhanced cursor accuracy due to the larger size of the touch sensitive pointing region as compared to the top surface of an individual key, and for providing the keyboard signals to a computer when in the keyboard mode of operation and the control data and control command signals to the computer when in the control mode of operation; said method including the steps of:
   (a) beginning operation in the keyboard mode of operation;
   (b) changing to the control mode of operation as a result of the production of the control signals in response to switching means; and
   (c) returning to the keyboard mode of operation as a result of the production of the keyboard signals in response to switching means.

* * * * *